April 21, 1936.  E. A. STALKER  2,037,940

MEANS FOR PREVENTING THE SEPARATION OF THE FLOW FROM CURVED SURFACES

Original Filed Sept. 10, 1932

Inventor

Edward A. Stalker

Patented Apr. 21, 1936

2,037,940

UNITED STATES PATENT OFFICE 2,037,940

MEANS FOR PREVENTING THE SEPARATION OF THE FLOW FROM CURVED SURFACES

Edward A. Stalker, Ann Arbor, Mich.

Application September 10, 1932, Serial No. 632,573
Renewed September 10, 1935

20 Claims. (Cl. 285—211)

My invention relates to means of reducing the fluid resistance between bodies and fluids, which arises from the failure of the flow to follow the body contour at localities where the body surface curves away from the center line of the flow. It relates generally to bodies having the lowest pressure on the downstream surfaces. Elongated bodies with blunt rear ends are of this type. Also bodies with a curved internal flow are of this type, of which a conduit with an elbow is a common example.

The general object of my invention is to reduce the relative resistance between the body and the fluid, so that in the case of a propelled vehicle, the vehicle requires less energy; and in the case of a conduit, so that a given flow of fluid requires less energy than otherwise.

In particular an object of my invention is to use in a conduit, the centrifugal pressure on the surface which curves toward the stream to energize the flow adjacent the surface which curves away from the stream. This arrangement prevents the main flow from separating from the surface. If the separation did occur (as it naturally does) there would be a low pressure region filled with fluid in a chaotic or turbulent state. As is well known such a state results in a great resistance to the relative flow.

When fluid flows along any surface there is a dissipation of energy as heat due to the friction between the fluid and the body. In fact at the surface of the body the fluid velocity is zero and only at some distance from the body does it attain the normal velocity. The layer of air close to the body and retarded by it is called the boundary layer. The presence of this layer is the reason that the flow does not close in smoothly behind a body, but rather becomes turbulent. The turbulent flow is indicative of a low pressure area downstream of the body which retards the relative movement between the body and the fluid. In the case of a vehicle, a resistance to forward motion appears.

The fluid may be made to follow the body contour if energy is added to the boundary layer to replace the energy dissipated in rubbing. Thus, if a jet is blown along the surface of the boundary layer it is accelerated and tends to move along with the remainder of the flow. If the boundary layer is removed by drawing it off the surface, the separation is likewise prevented. Both methods result in a great reduction of resistance, and there is a clear gain over and above the energy required for sucking and blowing.

The localities at which energy should be added to the boundary layer are in the vicinity of rapid changes of curvature. The amount of energy necessary may be greatly lessened by taking advantage of the pressure distribution about the body.

Where the flow travels rectilinearly as along a plane surface, the pressure remains substantially constant. Where the flow encounters a curve, the centrifugal force tends to increase the pressure on the outer curve or surface which curves toward the main stream. On the inner surface the centrifugal force tends to cause the fluid to leave the surface and cause a drop in pressure below that of the general stream.

Not all openings are suitable for boundary layer energization. For instance, if blowing is used the openings must be formed to discharge in the direction of the general flow so that the energy added helps to motivate the flow. If the holes are inclined upstream or normal to the surface, blowing will cause an increase in turbulence on a surface curved from the flow and only suction to remove the boundary layer inward will prove advantageous. Consider a conduit with walls subjected to pressure at one locality and suction at another. Openings in the two localities connected by a passage will give rise naturally to a high velocity flow, that is, a flow of high energy. The boundary layer on the suction surface will be energized only if its opening is directed downstream. Openings normal to the surface and subjected to an outward flow will increase the turbulence and therefore the resistance to flow.

It is only on the suction surfaces that the energization of the boundary layer is important. Only when there is suction will the flow tend to leave the surface.

Thus openings suitable for boundary layer energization are directed downstream if they emit fluid, but may have any orientation if fluid is drawn off the surface into the opening.

I attain the above objects by the means illustrated in the accompanying drawing in which—

Figure 1:
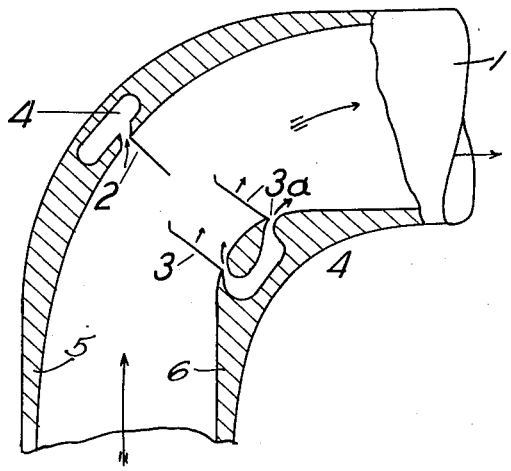
Figure 1 depicts a curved conduit partly in section to show the openings and passages for boundary layer energization.

In Figure 1 the conduit is indicated by 1. On the surface 5 curving toward the flow is an opening 2 leading into the passage 4 which extends circumferentially about the conduit to the inner wall where there are located discharge openings 3 and 3a. The opening 2 preferably faces upstream while the openings 3 and 3a face downstream and are designed to discharge fluid tangentially to the curve. In operation the centrifugal or dynamic pressure of the fluid at 2 forces a flow in the passage 4 and out the openings 3 and 3a. The surface 6 is the suction surface and the flow tends to leave this surface because of the accumulating boundary layer. The difference in pressure between openings 2, and 3 and 3a creates a jet of high kinetic energy which energizes the boundary layer and thereby suppresses its formation. The fluid stream then follows the contour of 6 and there is a great reduction in the resistance to flow.

Figure 2:
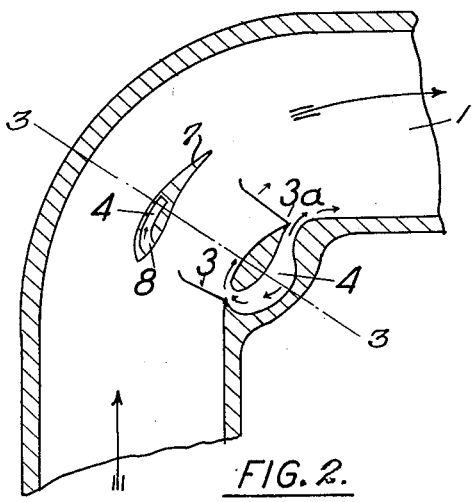
Figure 2 is a longitudinal section through a curved conduit illustrating another arrangement of the openings and passages for boundary layer energization.
Figure 3:
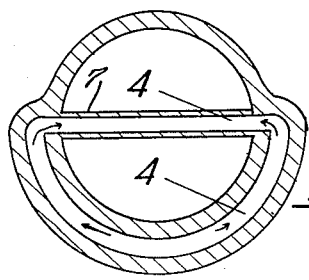
Figure 3 is a cross section of the conduit in Figure 2 and is taken along the line 3—3.

It is not necessary to restrict the opening 2 to the outer surface of the bend. Any region of pressure increase will serve the purpose. In Figures 2 and 3 I show an alternative arrangement. The vane 7 extends across the tube and on the under surface I locate the opening 8 where the full impact pressure of the fluid is realized. The opening 8 and passage 4 again supply a flow through the slots or openings 3 and 3a. It is common in aerodynamics to call the pressure at 8 the impact or dynamic pressure. The centrifugal pressure is also a dynamic pressure and the pressures at 2 or 8 have the same maximum value.

Figure 4:
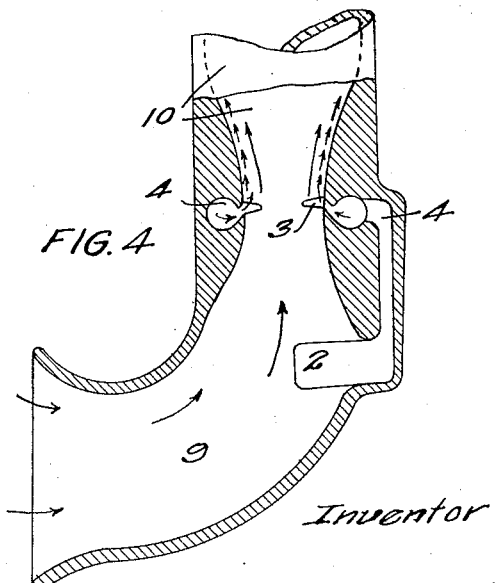
Figure 4 shows a Venturi tube partly in section and illustrates a means of using the pressure of the flow to energize the boundary layer on the Venturi walls.

In Figure 4 is shown the venturi 10 in communication with the curved conduit 9. On the curve I locate the induction opening 2 communicating by the passage 4 with openings 3 in the inner surface of the Venturi wall. The passage 4 extends peripherally about the venturi and the slots 3 should cover a large portion of the tube circumference. As is well known, a venturi has a pressure at its throat less than the pressure of the unrestricted flow. Due to the centrifugal pressure at 2 and the low pressure near the Venturi throat a high velocity jet is forced through the openings 3 which energizes and thereby suppresses the boundary layer. The openings 3 are designed to discharge downstream along the wall surface and preferably are located near the curve where the throat diverges to form what is commonly known as the diverging segment or diffuser of the venturi. By energizing the boundary layer the flow through any venturi is improved and it becomes possible to flare the divergent segment with a greater angle than customarily used. Above 7 degrees for the included angle of the diverging segment the resistance of a conventional diffuser becomes very large, but with boundary layer energization the angle may be as large as 120 degrees. This permits very short diffuser tubes.

I illustrate the method of creating and using centrifugal pressure to energize the boundary layer as being a preferred and economical form but I do not limit myself to this source of energy. Other energy sources may be used to augment or replace the centrifugal energy.

It is apparent that various other changes, variations and modifications and substitutions may be resorted to without departing from the spirit and scope of my invention, and hence I do not desire to limit myself to the exact and specific disclosures hereof.

I claim:

1. In combination, a body possessing an internal passage with a flow of fluid therein, said passage being bent and experiencing pressure on one face and suction on another due to the centrifugal action of the flow, and means to utilize the centrifugal pressure on one face to energize the boundary layer on the other face.

2. In a conduit associated with a flow of fluid within, a conduit wall curved in the direction of flow and possessing an opening in its surface, and means to utilize the impact pressure of the flow at the opening to energize the boundary layer on the conduit surface of least radius.

3. In combination, a conduit curved in the direction of the flow and in contact with a relatively moving fluid within, and a conduit wall having an opening in the inner surface near the beginning of the curve in communication with a passage leading to a downstream opening through which fluid flows tangentially to the surface due to the difference in pressure on the surface.

4. In combination with a conduit associated with a main flow within and bent in the direction of the flow, a divided wall surface to form a peripheral slot in the wall on the inside of the bend, said slot being formed to discharge fluid downstream tangentially to the inside surface of the tube, and means to supply fluid to the slot.

5. A conduit associated with a flow of fluid within and bent in the direction of flow, an opening in the inner surface of the wall on the inside of the bend and means of causing a flow through the opening.

6. In combination with a conduit associated with a relative flow within and curved in the direction of flow and creating a centrifugal pressure on one surface, a Venturi tube having an opening in its wall to discharge fluid tangentially to its surface, and means to use the centrifugal pressure to cause a flow through said opening.

7. In a Venturi tube associated with a flow of fluid a wall opening to discharge fluid tangentially to the wall surface, and means to supply fluid under pressure to the opening.

8. A Venturi tube associated with a flow of fluid, and means to discharge a fluid jet tangentially to the interior wall surface to energize the boundary layer and thereby induce the fluid to follow the diverging walls of the Venturi tube.

9. In a tube a segment of increasing cross sectional area and associated with a main flow of fluid, means to discharge an auxiliary fluid jet tangentially to the interior wall surface near the beginning of the expansion segment to energize the boundary layer and thereby induce the fluid to follow the walls of the expansion segment.

10. In combination, a body associated with a flow of fluid within, curved walls within, said body and flow creating within regions of unequal fluid pressure, a divided surface of said walls to form a slot for discharging downstream along the surface and means cooperating with the fluid flow to direct a flow through the said slot to energize the boundary layer.

11. In combination, a body associated with a flow of fluid within, diverging walls within, a divided surface of said walls to form a slot for discharging downstream along the surface, and means cooperating with the flow to direct a flow through the said slot to energize the boundary layer.

12. In combination, a body associated with a relative external flow of fluid, walls forming a conduit within the body and associated with a fluid flow within the conduit, said conduit giving rise to a region of pressure lower than that of the external flow and having an opening in its surface directed downstream near said low pressure region and means to expose the opening to the impact pressure of the relative flow of fluid.

13. In combination, a body associated with an external flow of fluid, walls forming a conduit within the body and associated with a flow of fluid, said conduit giving rise to regions of pressure lower than the external flow, openings in the conduit wall near a region of low pressure, and means to utilize the energy of the external flow to direct a flow through the said opening downstreamward along the conduit surface to energize its boundary layer.

14. In combination, a body possessing an internal passage with a flow of fluid therein, said passage being curved in the direction of flow, the passage wall curving away from the flow perforated to provide an opening directed downstream, and means employing the energy of the flow to direct a flow through said opening.

15. In combination, a body having a wall associated with a relative flow of fluid, said wall having an opening suitable for boundary layer energization by blowing near the locality where the surface turns from the flow, a vane spaced outwardly from the wall and containing an opening into the stream, and means of communication between the vane opening and the wall surface opening to direct a flow out the wall opening.

16. In a conduit associated with an internal flow of fluid, an expansion segment, a wall curving toward the flow, and means to use the centrifugal pressure of the fluid on the wall to energize the boundary layer of the surface of the expansion segment.

17. In a Venturi tube associated with a flow of fluid, a perforated interior surface of the tube to provide an opening directed downstream, and means of employing energy of the fluid to cause a flow through the said opening to energize the boundary layer within.

18. In a conduit associated with a flow of fluid within, said conduit being formed to create regions of unequal fluid pressure, divided surfaces of the conduit walls to form openings in the regions of unequal pressure suitable for use in boundary layer energization, and a passage substantially free of energy consuming devices communicating between low and high pressure openings to provide a flow capable of energizing the boundary layer on a low pressure surface.

19. In a hollow body associated with a main flow of fluid, walls within creating a region of fluid pressure lower than the pressure of the main flow, an opening in the wall directed downstream near the low pressure region, and a conduit communicating with the opening, said conduit being substantially free of energy consuming devices and subject at its entrance to the impact pressure of the main flow.

20. In combination, a wall having an opening therein and curving toward a flow of fluid, another wall having an opening and curving away from the said flow, and a conduit to establish communication between said openings.

EDWARD A. STALKER.